(12) United States Patent
Tomita et al.

(10) Patent No.: US 7,691,982 B2
(45) Date of Patent: Apr. 6, 2010

(54) DISPERSANT USING KRAFT LIGNIN AND NOVEL LIGNIN DERIVATIVE

(75) Inventors: Takashi Tomita, Toyonaka (JP); Tsuyoshi Hirata, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/663,536

(22) PCT Filed: Sep. 22, 2005

(86) PCT No.: PCT/JP2005/018048

§ 371 (c)(1),
(2), (4) Date: Mar. 22, 2007

(87) PCT Pub. No.: WO2006/033464

PCT Pub. Date: Mar. 30, 2006

(65) Prior Publication Data

US 2007/0260046 A1    Nov. 8, 2007

(30) Foreign Application Priority Data

Sep. 24, 2004    (JP) .................. 2004-276956

(51) Int. Cl.
*C07G 1/00* (2006.01)
*C08L 97/00* (2006.01)

(52) U.S. Cl. .................. 530/500; 530/504
(58) Field of Classification Search ............. 530/500, 530/504
See application file for complete search history.

(56) References Cited

U.S. PATENT DOCUMENTS

| | | | | |
|---|---|---|---|---|
| 2,680,113 A * | 6/1954 | Adler et al. | .......... | 530/500 |
| 2,846,431 A * | 8/1958 | Goss | .......... | 530/500 |
| 3,017,404 A * | 1/1962 | Ball | .......... | 530/500 |
| 3,546,199 A * | 12/1970 | Look et al. | .......... | 530/500 |
| 3,763,139 A * | 10/1973 | Falkehag | .......... | 530/504 |
| 3,795,665 A * | 3/1974 | Ludwig | .......... | 530/500 |
| 4,017,474 A * | 4/1977 | Glasser et al. | .......... | 530/502 |
| 4,233,162 A * | 11/1980 | Carney | .......... | 507/108 |
| 4,444,562 A * | 4/1984 | Lin | .......... | 8/528 |
| 4,450,106 A * | 5/1984 | Forss | .......... | 530/500 |
| 4,546,173 A * | 10/1985 | Dilling | .......... | 530/501 |
| 4,703,801 A * | 11/1987 | Fry et al. | .......... | 166/293 |
| 4,728,727 A * | 3/1988 | Reintjes et al. | .......... | 530/500 |
| 4,740,591 A * | 4/1988 | Dilling et al. | .......... | 530/505 |
| 4,769,434 A * | 9/1988 | Van der Klashorst et al. | .......... | 527/403 |
| 4,789,523 A * | 12/1988 | Schilling et al. | .......... | 422/12 |
| 4,808,641 A | 2/1989 | Yagi et al. | | |
| 4,891,415 A | 1/1990 | Lin et al. | | |
| 4,931,527 A * | 6/1990 | Meister | .......... | 527/400 |
| 4,936,918 A | 6/1990 | Furuhashi et al. | | |
| 4,962,173 A | 10/1990 | Kinoshita et al. | | |
| 4,977,227 A | 12/1990 | Negami et al. | | |
| 5,087,648 A | 2/1992 | Kinoshita et al. | | |
| 5,092,934 A | 3/1992 | Furuhashi et al. | | |
| 5,102,992 A * | 4/1992 | Glasser et al. | .......... | 530/502 |
| 5,290,869 A | 3/1994 | Kinoshita et al. | | |
| 5,320,671 A * | 6/1994 | Schilling | .......... | 106/277 |
| 5,466,289 A | 11/1995 | Yonezawa et al. | | |
| 5,567,277 A * | 10/1996 | Elliott et al. | .......... | 162/163 |
| 5,608,040 A * | 3/1997 | H uttermann et al. | .......... | 530/500 |
| 5,656,733 A * | 8/1997 | Suchanec | .......... | 530/500 |
| 6,019,835 A * | 2/2000 | Chatterji et al. | .......... | 106/725 |
| 6,172,204 B1* | 1/2001 | Sarkanen et al. | .......... | 530/500 |
| 6,680,348 B1 | 1/2004 | Amaya et al. | | |
| 6,689,737 B2* | 2/2004 | Scheibel | .......... | 510/462 |
| 2002/0065400 A1 | 5/2002 | Raskin et al. | | |

FOREIGN PATENT DOCUMENTS

| | | |
|---|---|---|
| EP | 0 291 590 | 11/1988 |
| EP | 1118598 A2 * | 7/2001 |
| JP | 58-38380 | 8/1983 |
| JP | 59-18338 | 4/1984 |
| JP | 62-68806 | 3/1987 |
| JP | 62-119147 | 5/1987 |
| JP | 62-216950 | 9/1987 |
| JP | 1-113419 | 5/1989 |
| JP | 1-145358 | 6/1989 |
| JP | 1-226757 | 9/1989 |
| JP | 4-149056 | 5/1992 |
| JP | 5-43288 | 2/1993 |
| JP | 5-36377 | 5/1993 |
| JP | 5-170501 | 7/1993 |
| JP | 6-191918 | 7/1994 |
| JP | 6-271347 | 9/1994 |
| JP | 6-298555 | 10/1994 |
| JP | 7-224135 | 8/1995 |
| JP | 7-267705 | 10/1995 |
| JP | 2508113 | 4/1996 |
| JP | 11-35362 | 2/1999 |
| JP | 2000-191356 | 7/2000 |

* cited by examiner

*Primary Examiner*—Mark Eashoo
*Assistant Examiner*—Liam J Heincer
(74) *Attorney, Agent, or Firm*—Wenderoth, Lind & Ponack, L.L.P.

(57) ABSTRACT

The dispersant of the present invention comprises at least one component unit derived from kraft lignin and/or its salt and at least one component unit derived from at least one water-soluble monomer. The novel lignin derivative of the present invention comprises at least one component unit derived from kraft lignin and/or its salt, at least one polyoxyalkylene chain, and at least one anionic functional group.

2 Claims, 6 Drawing Sheets

DISPERSANT USING KRAFT LIGNIN AND NOVEL LIGNIN DERIVATIVE

TECHNICAL FIELD

The present invention relates to a dispersant using kraft lignin and a novel lignin derivative obtained from kraft lignin.

BACKGROUND ART

Lignin, one of the main components of wood, has been used in many applications in the form of lignin derivatives by providing various modifications so far. For example, lignin sulfonic acid has widely been used as a cement dispersant. Also, for example, Japanese Patent Application Laid-Open Publication No. 1-145358 discloses making lignin sulfonic acid in the form of acrylic or vinyl monomer-modified derivatives for use of lignin sulfonic acid as a cement dispersant. On the other hand, U.S. Patent Application Publication No. 2002/0065400 discloses a resin composition mainly for binders, which is obtained by grafting kraft lignin with acrylic acid and crosslinking the obtained polymer with aldehydes. Further, U.S. Pat. No. 4,891,415 discloses a resin composition particularly suitable as dispersants and scale preventing agents, which is obtained by grafting lignin, for example, lignin sulfonic acid, with vinyl monomers.

However, in the case where the above-described conventional lignin derivatives, e.g., lignin sulfonic acid, are used as dispersants, there has been a problem that they do not have so sufficient cement dispersing performance. Therefore, it has been required to effectively improve the dispersing performance, which is intrinsic to the lignin skeleton, by chemical modification and efficiently utilize the resulting lignin derivatives as dispersants having high dispersing performance. Further, it has also been required to develop a novel lignin derivative from kraft lignin which has been used only as fuel in pulp plants.

DISCLOSURE OF THE INVENTION

Under the above-described circumstances, objects to be achieved by the present invention are to provide a dispersant exhibiting high dispersing performance by use of a lignin derivative obtained using kraft lignin discharged in the pulp production as a raw material; and to provide a novel lignin derivative from kraft lignin.

The present inventors have made various studies and consequently have found that a specific lignin derivative obtained from kraft lignin exhibits high dispersing performance and that a novel lignin derivative can be obtained from kraft lignin and exhibits similarly high dispersing performance, thereby completing the present invention.

That is, the present invention provides a dispersant comprising a lignin derivative having at least one component unit derived from kraft lignin and/or its salt and at least one component unit derived from at least one water-soluble monomer. With respect to the dispersant of the present invention, the lignin derivative may preferably be obtained by reacting at least one water-soluble monomer in the presence of kraft lignin and/or its salt. Also, with respect to the dispersant of the present invention, the lignin derivative may preferably have at least one anionic functional group and/or may preferably have at least one polyalkylene oxide chain. The dispersant of the present invention may preferably be suitable, for example, as a cement dispersant.

The present invention further provides a lignin derivative having at least one component unit derived from kraft lignin and/or its salt, at least one polyoxyalkylene oxide chain, and at least one anionic functional group.

As compared with conventional dispersants such as lignin sulfonic acid, the dispersant of the present invention can exhibit high dispersing performance. Therefore, for example, if it is used in a cement dispersant, the viscosity of kneaded mortar and concrete is lowered and the workability is improved. The novel lignin derivative of the present invention can similarly exhibit high dispersing performance and can widely be used for dispersants, chelating agents, detergents, flocculants, thickeners, coating agents, painting materials, adhesives, water-absorbing resins, and the like.

BEST MODE FOR CARRYING OUT THE INVENTION

<<Dispersant>>

The dispersant of the present invention is characterized in that it contains a lignin derivative having at least one component unit derived from kraft lignin and/or its salt and at least one component unit derived from at least one water-soluble monomer. The term "kraft lignin" as used herein means a water-insoluble compound obtained by reaction of wood with a mixed aqueous solution of sodium hydroxide and sodium sulfide, the compound having hydroxyphenylpropane as a base unit and having functional groups such as a phenolic hydroxyl group, an alcoholic hydroxyl group, and a thiol group. Further, the term "component unit derived from kraft lignin and/or its salt" as used herein means a portion derived from kraft lignin and/or its salt as a raw material in the molecular structure of the lignin derivative. Further, the term "component unit derived from water-soluble monomer" as used herein means a portion derived from the water-soluble monomer to be reacted with kraft lignin and/or its salt as a raw material in the molecular structure of the lignin derivative.

<Lignin Derivative>

Also, the term "lignin derivative" as used herein means a compound obtained by reacting a water-soluble monomer with a functional group such as a phenolic hydroxyl group, an alcoholic hydroxyl group, and a thiol group contained in kraft lignin and/or its salt, or producing a radical by reaction of a radical starting agent with kraft lignin and/or its salt and then reacting a water-soluble monomer with the radical, wherein the compound has a component unit derived from kraft lignin and/or its salt and a component unit derived from a water-soluble monomer. In the case where the water-soluble monomer has a polymerizable double bond, the component unit derived from the water-soluble monomer corresponds to the structure formed by opening the polymerizable double bond of each monomer (i.e., the structure in which a double bond (C=C) becomes a single bond (—C—C—)).

The mass average molecular weight of the lignin derivative is not particularly limited and as the value measured by gel permeation chromatography (referred to hereinafter as "GPC" in some cases) in conversion to polyethylene glycol, it may preferably be not lower than 1,000 and not higher than 500,000, more preferably not lower than 5,000 and not higher than 300,000, and still more preferably not lower than 10,000 and not higher than 150,000. If a lignin derivative with a mass average molecular weight in such a range is used, a dispersant having higher dispersing performance can be obtained.

The amount of the lignin derivative to be added in the dispersant of the present invention may preferably be not smaller than 50% by mass and not greater than 100% by mass, more preferably not smaller than 70% by mass and not greater than 100% by mass, and still more preferably not smaller than 90% by mass and not greater than 100% by mass, relative to the total mass of the dispersant. If the amount of the lignin derivative to be added is smaller than 50% by mass, the high dispersing performance of the lignin derivative cannot sufficiently be exhibited in some cases.

<Production of Lignin Derivative>

The kraft lignin and/or its salt to be a raw material for the lignin derivative are not particularly limited, so long as they are obtained by reaction of wood with a mixed aqueous solution of sodium hydroxide and sodium sulfide. The wood to be a raw material for the kraft lignin and/or its salt may include needle-leaved trees such as Japanese spruce, Japanese red pine, Japanese cedar, and Japanese cypress; and broadleaf trees such as white birch and Japanese beech. These woods may be used alone, or two or more kinds of them may also be used in combination.

To produce the lignin derivative, as described above, there may be caused reaction of a water-soluble monomer with functional groups such as a phenolic hydroxyl group, an alcoholic hydroxyl group, and a thiol group contained in kraft lignin and/or its salt, and accordingly, a component unit derived from kraft lignin and/or its salt and a component unit derived from a water-soluble monomer can be introduced into the lignin derivative.

Examples of the water-soluble monomer to be reaction with a phenolic hydroxyl group and an alcoholic hydroxyl group in the functional groups contained in the kraft lignin and/or its salt may include alkylene oxides such as ethylene oxide and propylene oxide. On the other hand, examples of the water-soluble monomer to be reaction with a thiol group may include alkylene oxides such as ethylene oxide and propylene oxide; and alkylene imines such as ethyleneimine and propyleneimine. These water-soluble monomers may be used alone, or two or more kinds of them may also be used in combination.

Alternatively, radical polymerizable water-soluble monomers may be reacted with the functional groups such as a phenolic hydroxyl group, an alcoholic hydroxyl group, and a thiol group contained in the kraft lignin and/or its salt. Those recited in the following (1) to (4) can be used as the radical polymerizable water-soluble monomer. These radical polymerizable water-soluble monomers may be used alone, or two or more kinds of them may also be used in combination.

(1) Unsaturated monocarboxylic acids such as acrylic acid, methacrylic acid, and crotonic acid, and their monovalent metal salts, divalent metal salts, ammonium salts, and organic ammonium salts; unsaturated dicarboxylic acids such as maleic acid, fumaric acid, itaconic acid, and citraconic acid, and their anhydrides, monovalent metal salts, divalent metal salts, ammonium salts, and organic ammonium salts; half esters or diesters of alcohols having 1 to 30 carbon atoms and unsaturated dicarboxylic acids such as maleic acid, fumaric acid, itaconic acid, and citraconic acid; half amides or diamides of amines having 1 to 30 carbon atoms and unsaturated dicarboxylic acids such as maleic acid, fumaric acid, itaconic acid, and citraconic acid; half esters or diesters of alkoxy (poly)alkylene glycols obtained by adding 1 to 500 moles of alkylene oxides having 2 to 18 carbon atoms to alcohols having 1 to 30 carbon atoms or amines having 1 to 30 carbon atoms with unsaturated dicarboxylic acids such as maleic acid, fumaric acid, itaconic acid, and citraconic acid; half esters or diesters of glycols having 2 to 18 carbon atoms or their 2 to 500 moles adducts, polyalkylene glycols, with unsaturated dicarboxylic acids such as maleic acid, fumaric acid, itaconic acid, and citraconic acid; esters of unsaturated monocarboxylic acids and alcohols having 1 to 30 carbon atoms, such as methyl (meth)acrylate, ethyl (meth)acrylate, propyl (meth)acrylate, glycidyl (meth)acrylate, methyl crotonate, ethyl crotonate, and propyl crotonate; esters of alkoxy (poly)alkylene glycols obtained by adding 1 to 500 moles of alkylene oxides having 2 to 18 carbon atoms to alcohols having 1 to 30 carbon atoms with unsaturated monocarboxylic acids such as (meth)acrylic acid and crotonic acid; and addition compounds of unsaturated monocarboxylic Acids such as (meth)acrylic acid with 1 to 500 moles of alkylene oxides having 2 to 18 carbon atoms, such as (poly)ethylene glycol monomethacrylate, (poly)propylene glycol monomethacrylate, and (poly)butylene glycol monomethacrylate.

(2) unsaturated sulfonic acids such as vinyl sulfonate, (meth)allyl sulfonate, 2-(meth)acryloxyethyl sulfonate, 3-(meth)acryloxypropyl sulfonate, 3-(meth)acryloxy-2-hydroxypropyl sulfonate, 3-(meth)acryloxy-2-hydroxypropyl sulfophenyl ether, 3-(meth)acryloxy-2-hydroxypropyloxy sulfobenzoate, 4-(meth)acryloxybutyl sulfonate, (meth)acrylamidomethylsulfonic acid, (meth)acrylamidoethylsulfonic acid, 2-methylpropanesulfonic acid (meth)acrylamide, styrenesulfonic acid and 2-hydroxy-3-allyloxy-1-propanesulfonic acid sodium salt, and their monovalent metal salts, divalent metal salts, ammonium salts, and organic ammonium salts.

(3) unsaturated amides such as (meth)acrylamide, (meth)acrylalkylamide, N-methylol(meth)acrylamide, and N,N-dimethyl(meth)acrylamide; unsaturated cyanides such as (meth)acrylnirile and α-chloroacrylnitrile; unsaturated esters such as vinyl acetate and vinyl propionate; unsaturated amines such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate, and vinylpyridine; allyls such as (meth)allyl alcohol, and glycidyl (meth)allyl ether; N-vinyl compounds such as N-vinylsuccinimide, N-vinylcarbazole, 1-vinylimidazole, N-vinylcaprolactam, N-vinyloxazolidone, N-vinylpyrrolidone, N-vinylformamide, N-methyl-N-vinylformamide, N-vinylacetamide, and N-methyl-N-vinylacetamide; and vinyl ethers such as methyl vinyl ether, ethyl vinyl ether, 2-hydroxyethyl vinyl ether, 4-hydroxybutyl vinyl ether, and diethylene glycol monovinyl ether.

(4) alkylene oxide addition compounds of unsaturated alcohols obtained by adding 2 to 300 moles of alkylene oxides to unsaturated alcohols such as allyl alcohol, methallyl alcohol, and 3-methyl-3-buten-1-ol.

The reaction points for introducing the water-soluble monomer-derived component units into the lignin derivative may include a phenolic hydroxyl group, an alcoholic hydroxyl group, and a thiol group contained in the kraft lignin and/or its salt, and in addition to them, may also include the points in which hydrogen radical is drawn out and thus a radical is produced when reacted with a radical initiator. As the water-soluble monomers to be obtained by causing the reaction of kraft lignin with a radical initiator and further causing reaction with the resulting radical, there can be used those radical polymerizable water-soluble monomers recited above.

The amount of the water-soluble monomer to be used for reaction with kraft lignin and/or its salt (or reaction in the presence of kraft lignin and/or its salt) is not particularly limited, and it may preferably be, for example, not smaller than 1.0% by mass and not greater than 99.9% by mass, more preferably not smaller than 20.0% by mass and not greater than 99.5% by mass, and still more preferably not smaller than 40.0% by mass and not greater than 99.0% by mass, relative to the total mass of the kraft lignin and/or its salt and the water-soluble monomer. If the amount of the water-soluble monomer to be used is smaller than 1.0% by mass, the water solubility of the obtained lignin derivative is not sufficient, and for example, in the case where water is used as a dispersion medium, the dispersing performance may possibly be deteriorated in some cases. In contrast, if the amount of the water-soluble monomer to be used is greater than 99.9% by mass, the performance of the lignin skeleton, that is, the effect of improving dispersibility, cannot be exhibited in some cases, and the effect of decreasing the viscosity of concrete when used in a cement dispersant, cannot be exhibited in some cases.

When kraft lignin and/or its salt are reacted with, for example, alkylene oxides and alkyleneimines, a solvent may be used, if necessary. In the case where a solvent is used for the reaction, the solvent which can be used for the reaction is not particularly limited, and examples thereof are water; alcohols such as methyl alcohol, ethyl alcohol, and isopropyl alcohol; aromatic or aliphatic hydrocarbons such as benzene, toluene, xylene, cyclohexane, and n-hexane; esters such as ethyl acetate; ketones such as acetone and methyl ethyl ketone; and cyclic ethers such as tetrahydrofuran and dioxane. These solvents may be used alone, and two or more kinds of them may also be used in combination.

Further, if necessary, a catalyst may be used for the above-described reaction. In the case where a catalyst is used for the reaction, any of acid catalysts and base catalysts may be used, and preferred are, for example, sodium hydroxide and potassium hydroxide. The amount of the catalyst to be used is not particularly limited, and it may preferably be, for example, not smaller than 0.001% by mass and not greater than 20% by mass and more preferably not smaller than 0.01% by mass and not greater than 10% by mass, relative to the total mass of the kraft lignin and/or its salt and the water-soluble monomer.

The reaction temperature of the above-described reaction may appropriately be set depending on the kind of the solvent to be used, and although it is not particularly limited, it is usually not lower than 0° C. and not higher than 200° C. Further, particularly in the case of reaction of a low boiling point compound such as ethylene oxide and ethyleneimine, to improve the reaction speed, reaction may be carried out under application of pressure using an autoclave or the like.

In the case of using a radical polymerizable water-soluble monomer, monomer components containing the monomer may be graft-polymerized using a polymerization initiator. The graft polymerization can be carried out by a solution polymerization and a bulk polymerization. The solution polymerization can be carried out in a batch manner or a continuous manner.

The solvent to be used for the graft polymerization is not particularly limited, and examples thereof are water; alcohols such as methyl alcohol, ethyl alcohol, and isopropyl alcohol; aromatic or aliphatic hydrocarbons such as benzene, toluene, xylene, cyclohexane, and n-hexane; esters such as ethyl acetate; ketones such as acetone and methyl ethyl ketone; and cyclic ethers such as tetrahydrofuran and dioxane. These solvents may be used alone, and two or more kinds of them may also be used in combination.

In the case where maleic anhydride is used as a maleic acid type monomer, to avoid cleavage of the acid anhydride group, it is preferable to use an inactive solvent such as aromatic or aliphatic hydrocarbons such as benzene, toluene, xylene, cyclohexane, and n-hexane; esters such as ethyl acetate; and ketones such as acetone and methyl ethyl ketone. On the other hand, in the case where maleic acid and/or its salt is used as a maleic acid type monomer, it is preferable to use at least one kind of solvents selected from the group consisting of water and lower alcohols having 1 to 4 carbon atoms. In particular, the use of water as a solvent is more preferable since any solvent removal step can be omitted.

In the case where solution polymerization is carried out using water as a solvent, as a radical polymerization initiator, there can be used a water-soluble polymerization initiator, for example, persulfates such as ammonium persulfate, sodium persulfate, and potassium persulfate; hydrogen peroxide; water-soluble azo type initiators, e.g., azoamidine compounds such as 2,2'-azobis(2-methylpropionamidine) dihydrochloride, cyclic azoamidine compounds such as 2,2'-azobis [2-(2-imidazolin-2-yl)propane]dihydrochloride, and azonitrile compounds such as 2-carbamoyl azoisobutyronitrile. These polymerization initiators may be used alone, and two or more kinds of them may also be used in combination. The amount of the polymerization initiator to be used may appropriately be adjusted depending on the kind and the amount of the water-soluble monomer, and although it is not particularly limited, it may preferably be, for example, not smaller than 0.01% by mole and not greater than 50% by mole, more preferably not smaller than 1% by mole and not greater than 20% by mole, relative to all the water-soluble monomers to be used.

In this case, a promoter (a reducing agent) such as alkali-metal sulfites such as sodium hydrogen sulfite, alkali metal metadisulfites, sodium hypophosphite, Fe(II) salts such as Mohr's salt, sodium hydroxymethanesulfonate dihydrate, hydroxylamine hydrochloride, thiourea, L-ascorbic acid or its salt, erysorbic acid or its salt can be used in combination. These promoters (reducing agents) may be used alone, or two or more kinds of them may also be used in combination. In particular, a combination of hydrogen peroxide and an organic type reducing agent is preferable, and as the organic type reducing agent are particularly preferable L-ascorbic acid or its salt, L-ascorbic acid esters, erysorbic acid or its salt, and erysorbic acid esters. The amount of the promoter (the reducing agent) to be used is not particularly limited, and it may preferably be, for example, not smaller than 0.1% by mole and not greater than 50% by mole, more preferably not smaller than 1% by mole and not greater than 200% by mole, and still more preferably not smaller than 10% by mole and not greater than 100% by mole, relative to the polymerization initiator to be used.

In the case of carrying out solution polymerization using lower alcohols, aromatic or aliphatic hydrocarbons, esters, or ketones as a solvent, or in the case of carrying out bulk polymerization, a radical polymerization initiator, e.g., peroxides such as benzoyl peroxide, lauroyl peroxide, and sodium peroxide; hydroperoxides such as t-butyl hydroperoxide and cumene hydroperoxide; and azo compounds such as azobis (isobutyronitrile) may be used as a radical polymerization initiator. These radical polymerization initiators may be used alone, or two or more kinds of them may also be used in combination. The amount of the radical polymerization initiator to be used may appropriately be adjusted depending on the kind and the amount of the water-soluble monomers, and although it is not particularly limited, it may preferably be, for example, not smaller than 0.01% by mole and not greater than 50% by mole and more preferably not smaller than 1% by mole and not greater than 20% by mole, relative to all the water-soluble monomers to be used.

In this case, a promoter such as amine compounds can also be used in combination. Further, in the case where a mixed solvent containing water and a lower alcohol is used, appropriate selection for use may be made from the above-described radical polymerization initiators, or from the combinations of the above-described polymerization initiators and the above-described promoters. The amount of the promoter to be used is not particularly limited, and it may preferably be, for example, not smaller than 0.1% by mole and not greater than 500% by mole, more preferably not smaller than 1% by mole and not greater than 200% by mole, and still more preferably not smaller than 10% by mole and not greater than 100% by mole, relative to the radical polymerization initiator to be used.

The polymerization temperature of the above-described graft polymerization may appropriately be set depending on the kind of the solvent and the kind of the polymerization initiator to be used, and although it is not particularly limited, it may preferably be, for example, not lower than 0° C. and not higher than 150° C., more preferably not lower than 30° C. and not higher than 120° C., and still more preferably not lower than 50° C. and not higher than 100° C.

A method of loading the respective monomers to a reaction vessel is not particularly limited, and it may be any of a method of collectively loading the whole amounts of the monomers to the reaction vessel in an initial period, a method of separately or continuously loading the whole amounts of the monomers to the reaction vessel, and a method of loading a portion of the monomers to the reaction vessel in an initial period and then separately or continuously loading the rest of the monomers to the reaction vessel. The radical polymerization initiator may be added to the reaction vessel from the beginning or may be added dropwise to the reaction vessel, or their manners may appropriately be combined depending on the purposes.

To adjust the molecular weight of the lignin derivative to be obtained, a chain transfer agent may be used, if necessary. In the case of using a chain transfer agent for the polymerization reaction, the chain transfer agents which can be used may be previously known hydrophilic chain transfer agents, e.g., thiol type chain transfer agents such as mercaptoethanol, thioglycerol, thioglycolic acid, 3-mercaptopropionic acid, thiomalic acid, and 2-mercaptoethanesulfonic acid; secondary alcohols such as isopropyl alcohol; lower oxides and their salts such as phosphorous acid, hypophosphorus acid and its salts (sodium hypophosphite, potassium hypophosphite, etc.), sulfurous acid, hydrogensulfurous acid, dithionous acid, metabisulfurous acid, and their salts (sodium sulfite, sodium hydrogensulfite, sodium dithionite, sodium metabisulfite, etc.). Further, in the case of using a hydrophobic chain transfer agent, it is effective to improve the viscosity of a concrete composition, if the dispersant of the present invention is used in a cement dispersant. As the hydrophobic chain transfer agent, thiol type chain transfer agents containing hydrocarbon groups having three or more carbon atoms, such as butanethiol, octanethiol, decanethiol, dodecanethiol, hexadecanethiol, octadecanethiol, cyclohexyl mercaptan, thiophenol, octyl thioglycolate, and octyl 3-mercaptopropionate are suitable for use. These hydrophilic chain transfer agents and hydrophobic chain transfer agents may be used alone, or two or more kinds of them may also be used in combination. Further, the hydrophilic chain transfer agents and the hydrophobic chain transfer agents may be used in combination. Further, to control the molecular weight, it is also effective to use monomers having high chain transferring property, such as (meth)allylsulfonic acid and its salts. The amount of the chain transfer agent to be used may appropriately be adjusted depending on the kind and the amount of the water-soluble monomers, and although it is not particularly limited, it may preferably be, for example, not smaller than 0.1% by mole and not greater than 50% by mole and more preferably not smaller than 1% by mole and not greater than 20% by mole, relative to all the water-soluble monomers to be used.

In the above-described graft polymerization, to obtain a graft polymer having a prescribed molecular weight with high reproducibility, it is required to stably promote the polymerization reaction. Therefore, in the case of carrying out solution polymerization, the dissolved oxygen concentration at 25° C. in a solvent to be used is set to be preferably not greater than 5 ppm, more preferably not smaller than 0.01 ppm and not greater than 4 ppm, still more preferably not smaller than 0.01 ppm and not greater than 2 ppm, and most preferably not smaller than 0.01 ppm and not greater than 1 ppm. In the case where air purge with nitrogen gas is carried out after the addition of monomers to a solvent, the dissolved oxygen concentration in the system containing the monomers is made to be the above-described one.

The control of dissolved oxygen concentration in the solvent may be carried out in a polymerization reaction vessel, or a solvent whose dissolved oxygen concentration has previously been controlled may be used. The following methods (1) to (5) can be recited as the method of removing oxygen from the solvent.

(1) After packing an inert gas such as nitrogen gas with pressure in a closed vessel containing a solvent, the pressure in the closed vessel is decreased to lower the partial pressure of oxygen gas in the solvent. The pressure in the closed vessel may also be decreased under a nitrogen gas flow.

(2) After the gas phase portion of a closed vessel containing a solvent is replaced with an inert gas such as nitrogen gas, and at the same time, the liquid phase portion is rigorously stirred for a long time.

(3) An inert gas such as nitrogen gas is bubbled in a solvent contained in a vessel for a long time.

(4) Once a solvent is boiled and then cooled in an inert gas atmosphere such as nitrogen gas.

(5) a static type mixing apparatus (a static mixer) is installed in the middle of a pipe line, and an inert gas such as nitrogen gas is mixed in the pipe line where a solvent is transferred to a polymerization reaction tank.

In the case where the lignin derivative obtained by the above-described graft polymerization is used, for example, in a cement dispersant, from the viewpoint of handling property, it is preferable to control the pH to be weakly acidic or higher in an aqueous solution state, more preferable to control the pH to be 4 or higher, still more preferable to control the pH to be 5 or higher, and particularly more preferable to control the pH to be 6 or higher. The pH control can be carried out, for example, using an alkaline substance such as inorganic salts, e.g., hydroxides and carbonates of monovalent metals and divalent metals; ammonia; and organic amines. These alkaline substances may be used alone, or two or more kinds of them may also be used in combination. Also, if the pH is required to be lowered, particularly if the pH control is required in the polymerization, the pH control can be carried out using an acidic substance such as phosphoric acid, sulfuric acid, nitric acid, alkylphosphoric acid, alkylsulfuric acid, alkylsulfonic acid, and (alkyl)benzenesulfonic acid. These acidic substances may be used alone, or two or more kinds of them may also be used in combination. In these acidic substances, because of having pH buffering function, phosphoric acid is particularly preferable. After completion of the reaction, if necessary, the concentration control may also be carried out.

To produce the lignin derivative, the water-soluble monomers are used for reaction with kraft lignin and/or its salt in the above-described method; however, the water-soluble monomers may also be reacted with kraft lignin and/or its salt chemically modified by a method such as alkylation, alkoxylation, sulfonation, sulfation, alkoxysulfation, sulfomethylation, aminomethylation, and the like, and after the reaction of the water-soluble monomers with kraft lignin and/or its salt, the above-described chemical modification may also be carried out. Further, after reaction of the water-soluble monomers, crosslinking may be carried out using formaldehyde and polyfunctional crosslinking agents.

<Defoaming Agent>

The dispersant of the present invention may contain previously known additives without deteriorating the dispersing performance. The previously known additives may include, as specific examples, defoaming agents, air entraining agents, moisturizing agents, water-proofing agents, and viscosity improvers. These additives may be used alone or two or more of them may be used in combination.

The defoaming agents, which are one of the representative additives, will hereinafter be described.

In the case where a defoaming agent is mixed in the dispersant of the present invention, the defoaming agent may be added after the lignin derivative is produced or before or during the reaction of the water-soluble monomer with the kraft lignin and/or its salt. Examples of the defoaming agent which can be used are polyoxyalkylenes such as (poly)oxyethylene (poly)oxypropylene adducts; polyoxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols having 12 to 14 carbon atoms; polyoxyalkylene (alkyl)aryl ethers such as polyoxypropylene phenyl ether and polyoxyethylene nonylphenyl ether; acetylene ethers obtained by addition polymerization of alkylene oxide to acetylene alcohols such as 2,4,7,9-tetramethyl-5-decine-4,7-diol, 2,5-dimethyl-3-hexine-2,5-diol, and 3-methyl-1-butin-3-ol; (poly)oxyalkylene fatty acid esters such as diethylene glycol oleic acid ester, diethylene glycol lauric acid ester, and ethylene glycol distearic acid ester; polyoxyalkylene sorbitan fatty acid esters such as polyoxyethylene sorbitan monolauric acid ester and polyoxyethylene sorbitan trioleic acid ester; polyoxyalkylene alkyl(aryl)ether sulfuric acid ester salts such as polyoxypropylene methyl ether sulfate sodium salt and polyoxyethylene dodecyl phenyl ether sulfate sodium salt; polyoxyalkylene alkyl phosphoric acid esters such as polyoxyethylene stearyl phosphoric acid ester; polyoxyalkylene alkylamines such as polyoxypropylene polyoxyethylene lauryl amine (propylene oxide 1 to 20 mole adducts, ethylene oxide 1 to 20 mole adducts, etc.), cured beef tallow amines to which alkylene oxides are added (propylene oxide 1 to 20 mole adducts, ethylene oxide 1 to 20 mole adducts, etc.); and polyoxyalkylene amides. These defoaming agents may be used alone, or two or more kinds of them may also be used in combination.

The amount of the defoaming agent to be added may preferably be not smaller than 0.0001% by mass and not greater than 10% by mass and more preferably not smaller than 0.001% by mass and not greater than 8% by mass, relative to the weight of the lignin derivative. If the amount of the defoaming agent to be added is smaller than 0.0001% by mass, the defoaming effect cannot be exhibited sufficiently in some cases. In contrast, if the amount of the defoaming agent to be added is greater than 20% by mass, the defoaming effect is substantially saturated, and in addition, the defoaming agent is used exceedingly, resulting in an increase of production cost.

<Material to be Dispersed>

The material to be dispersed using the dispersant of the present invention is not particularly limited, and there can be mentioned various kinds of organic substances and inorganic substances. The shape of the material to be dispersed is not particularly limited, and examples thereof are powder-, particle-, granule-, fiber-, and plate-like shapes.

Specific examples of the organic substances are organic pigments such as fast yellow, disazo yellow, disazo orange, naphthol red, copper phthalocyanine type pigments, phosphorus molybdenum tungstic acid salt, tannic acid salts, Katanol, Tamol Lake, isoindolinone yellow greenish, isoindolinine etho redish, quinacridone, dioxazine violet, perylene Orange, perylene Vermilion, perylene Scarlet, perylene Red, and perylene Maroon; synthetic resins such as polycarbonate, poly(vinyl chloride), poly(methyl methacrylate), and fluorocarbon resins; and metal soaps such as aluminum stearate, zinc stearate, calcium stearate, magnesium stearate, zinc stearate-calcium stearate composite, lead stearate, cadmium stearate, barium stearate, calcium laurate, and zinc laurate. These organic substances have an average particle diameter of usually not greater than 100 μm, preferably not smaller than 0.1 μm and not greater than 50 μm. These organic substances may be used alone, or two or more kinds of them may also be used in combination.

Specific examples of the inorganic substances are silicates such as kaolin, aluminum silicate, clay, talc, mica, calcium silicate, sericite, and bentonite; carbonates such as calcium carbonate, magnesium carbonate, barium carbonate, and basic lead carbonate; sulfates such as calcium sulfate and barium sulfate; chromates such as strontium chromate and Pigment Yellow; molybdates such as zinc molybdate, calcium molybdate, and magnesium molybdate; metal oxides such as alumina, antimony oxide, titanium oxide, cobalt oxide, triiron tetroxide, diiron trioxide, trilead tetroxide, lead monoxide, chromium oxide green, tungsten trioxide, and yttrium oxide; metal hydroxides such as aluminum hydroxide, magnesium hydroxide, calcium hydroxide, iron hydroxide, and matatitanic acid; metal carbides such as silicon carbide, tungsten carbide, boron carbide, and titanium carbide; aluminum nitride, silicon nitride, boron nitride, zirconia, barium titanate, satin white, carbon black, graphite, Chrome Yellow, mercury sulfide, Ultramarine, Paris Blue, Titanium Yellow, Chrome vermilion, Lithopone, copper acetoarsenite, nickel, silver, palladium, and lead titanate zirconate. These inorganic substances have an average particle diameter of usually not greater than 100 μm and preferably not smaller than 0.1 μm and not greater than 50 μm. These inorganic substances may be used alone, or two or more kinds of them may also be used in combination.

A dispersion medium for dispersing the above-described organic substances and/or inorganic substances using the dispersant of the present invention is not particularly limited, and examples thereof are water; fuel oils such as lamp oil, light oil, and kerosene; aliphatic hydrocarbons such as hexane, isohexane, cyclohexane, methylcyclohexane, and isooctane; aromatic hydrocarbons such as benzene, toluene, xylene, and cresol; alcohols such as ethanol, methanol, isopropyl alcohol, butyl alcohol, and pentyl alcohol; esters such as ethyl acetate and dioctyl phthalate; ethers such as ethylene glycol, diethylene glycol, triethylene glycol, tetraethylene glycol, propylene glycol, polyethylene glycol, polypropylene glycol, ethylene glycol monobutyl ether, carbitol, monoglyme, diglyme, tetraglyme, methyl cellosolve, and butyl cellosolve; diols such as butanediol, pentanediol, and hexanediol; halogenated hydrocarbons such as 1,1,1-trichloroethane, trichloroethylene, dichloroethylene, and chlorodifluoromethane; ketones such as methyl isoamyl ketone, methyl isobutyl ketone, acetone, and methyl ethyl ketone; terpineol, liquid paraffin, mineral spirit, N-(2-hydroxyethyl)pyrrolidone, and glycerin. In these dispersing mediums, water is particularly suitable. These dispersing mediums may be used alone, or two or more kinds of them may also be used in combination.

In the case where the dispersant of the present invention is used, a method of mixing it with a dispersing medium is not particularly limited. For example, it may be carried out by mixing the dispersant of the present invention with the dispersing medium at first and then adding them to a material to be dispersed, or it may also be carried out by adding the dispersant of the present invention simultaneously or successively to the dispersing medium and the material to be dispersed. Alternatively, it may also be carried out by previously mixing the material to be dispersed with the dispersing medium and then adding the dispersant of the present invention thereto.

The amount of the dispersant of the present invention to be used may appropriately be adjusted depending on the kind and the amount of the material to be dispersed, and although it is not particularly limited, it may preferably be not smaller than 0.01 parts by mass and not greater than 10 parts by mass and more preferably not smaller than 0.1 parts by mass and not greater than 5 parts by mass, relative to 100 parts by mass of the material to be dispersed. The dispersing medium is usually added in an amount of not smaller than 20 parts by mass and not greater than 1,000 parts by mass, relative to 100 parts by mass of the material to be dispersed.

<<Cement Dispersant>>

The dispersant of the present invention can be used for various applications, and it is particularly suitable as a cement dispersant. Thus, the case of using the dispersant of the present invention as a cement dispersant will hereinafter be described in detail.

In the case of using the dispersant of the present invention as a cement dispersant, it may be used in the form of an aqueous solution, or in the form of powder by neutralizing with a hydroxide of a divalent metal such as calcium and magnesium to form a polyvalent metal salt after the reaction, and then drying; or by allowing it to be carried on an inorganic powder such as a silica fine powder, and then drying; or by drying to solidify it in a thin film-like state on a support using a drum type drying apparatus, a disk type drying apparatus, or a belt type drying apparatus, and then pulverizing; or by drying to solidify it with a spray drier. Further, the powdered dispersant of the present invention may previously be added to a cement composition containing no water, such as cement powder and dry mortar, and then used as a premixed product to be used for a plaster work, floor finishing, grouting, and the like, or maybe added at the time of kneading a cement composition.

The dispersant of the present invention is useful as a cement dispersant and can be used for various kinds of hydraulic materials, i.e., cement compositions of cement, gypsum, or the like, and other hydraulic materials. Specific examples of the hydraulic compositions containing such hydraulic materials, water, and the dispersant of the present invention and further, if necessary, fine aggregate (sand) and coarse aggregate (crushed rock) are cement pastes, mortar, concrete, and plasters.

In the above-described hydraulic compositions, cement compositions using cement as a hydraulic material are most popular, and the cement compositions contain, as essential components, the dispersant of the present invention, cement, and water. Such cement compositions are one of the preferred embodiments of the present invention.

The cement to be used in the cement composition is not particularly limited, and specific examples thereof are portland cement (ordinal, high early strength, super high early strength, moderate heat, sulfate-resistant, and their low alkalinity type), various mixed cement (blast furnace cement, silica cement, fly ash cement), white portland cement, alumina cement, ultra quickly curable cement (1 clinker-quickly curable cement, 2 clinker-quickly curable cement, magnesium phosphate cement), cement for grouting, oil well cement, low heat generation cement, (low heat generation type blast furnace cement, fly ash-mixed low heat generation type blast furnace cement, high belite content cement), ultra high strength cement, cement type curing material, and eco-cement (cement produced using one or more municipal refuse incinerator ashes and wastewater sludge incinerator ashes). The cement composition may further contain fine powders such as blast furnace slag, fly ashes, sinter ashes, clinker ashes, husk ashes, silica fuse, silica powder, limestone powder, and gypsum. As aggregates, there can be used pebbles, crushed stone, water granulated slag, and regenerated aggregates, and in addition, silica stone type, clay type, zircon type, high alumina type, silicon carbide type, graphite type, chromium type, chromium-magnesium type, magnesia type refractory aggregates.

With respect to the unit amount of water, the amount of cement to be used, and the ratio of water/cement (by mass), per 1 $m^3$ of the above-described cement composition, the unit amount of water may preferably be not smaller than 100 kg/$m^3$ and not greater than 185 kg/$m^3$ and more preferably not smaller than 120 kg/$m^3$ and not greater than 175 kg/$m^3$; the amount of cement to be used may preferably be not smaller than 200 kg/$m^3$ and not greater than 800 kg/$m^3$ and more preferably not smaller than 250 kg/$m^3$ and not greater than 800 kg/$m^3$; and the ratio of water/cement (by mass) may preferably be not lower than 0.1 and not higher than 0.7 and more preferably not lower than 0.2 and not higher than 0.65; and it may be in a wide range from poor addition to rich addition. The dispersant of the present invention can be used in a high water reduced ratio region, that is, the ratio of water/cement (by mass) being in a low range of not lower than 0.15 and not higher than 0.5 (preferably not lower than 0.15 and not higher than 0.4), and can be effective for high strength concrete with a high unit amount of cement and a low ratio of water/cement and also a poor addition concrete with a unit amount of cement being not greater than 300 kg/$m^3$.

With respect to the above-described cement composition, the amount of the dispersant of the present invention to be added, for example, in the case of using it for mortar and concrete using hydraulic cement, may preferably be, in terms of solid content, not smaller than 0.01% by mass and not greater than 10.0% by mass, more preferably not smaller than 0.02% by mass and not greater than 5.0% by mass, still more preferably not smaller than 0.05% by mass and not greater than 3.0% by mass, and particularly preferably not smaller than 0.1% by mass and not greater than 2.0% by mass, relative to the mass of the cement. Such an amount gives desirable effects, for example, to decrease the unit amount of water, increase strength, and improve the durability. If the amount of the dispersant of the present invention to be added is smaller than 0.01% by mass, the dispersing performance cannot sufficiently be exhibited in some cases. In contrast, if the amount of the dispersant of the present invention to be added is greater than 10.0% by mass, the effect of improving dispersing performance is saturated, and in addition, the dispersant of the present invention is used exceedingly, thereby resulting in an increase of production cost.

The above-described cement composition has high dispersibility and dispersibility retaining performance even in a range of high water reduced ratio and also exhibits sufficient initial dispersibility and viscosity decreasing property even at a low temperature, and thus is excellent in the workability, so that the cement composition is useful for ready mixed concrete, concrete for a concrete secondary product (pre-cast concrete), concrete for centrifugal formation, concrete for vibration curing, steam aging concrete, spraying concrete, and the like, and is also useful for mortar and concrete required to have high fluidity, such as middle fluidity concrete (concrete with a slump value of not lower than 22 cm and not higher than 25 cm), high fluidity concrete (concrete with a slump value of not lower than 25 cm and a slump flow value of hot smaller than 50 cm and not higher than 70 cm), and self-compacting concrete, and self-leveling material.

Further, the cement dispersant of the present invention can be used in combination with previously known cement dispersants, and for example, the following ones cement dispersants be used.

Lignin sulfonic acid salts; polyol derivatives; naphthalenesulfonic acid formalin condensates; melaminesulfonic acid formalin condensates; polystyrenesulfonic acid salts; aminosulfonic acid type cement dispersants such as aminoarylsulfonic acid-phenol-formaldehyde condensates, as described in Japanese Patent Application Laid-Open Publication No. 1-113419; cement dispersants, as described in Japanese Patent Application Laid-Open Publication No. 7-267705, containing copolymers of polyalkylene glycol mono(meth) acrylic acid ester type compounds and (meth) acrylic acid type compounds, and/or their salts, as component (a), copolymers of polyalkylene glycol mono(meth)allyl ether type compounds and maleic anhydride and/or their hydrolyzed products, and/or their salts, as component (b), and copolymers of polyalkylene glycol mono(meth)allyl ether type compounds and maleic acid esters of polyalkylene glycol type compounds, and/or their salts, as component (c); concrete admixtures, as described in Japanese Patent No. 2508113, containing copolymers of (meth)acrylic acid polyalkylene glycol esters and (meth)acrylic acid (salts) as component A, specific polyethylene glycol polypropylene glycol type compounds as component B, and specific surfactants as component C; copolymers containing (meth)acrylic acid polyethylene (propylene) glycol ester or polyethylene (propylene)glycol mono (meth)allyl ether, (meth)allylsulfonic acid (or its salt), and (meth)acrylic acid (or its salt), as described in Japanese Patent Application Laid-Open Publication No. 62-216950; copolymers containing (meth)acrylic acid polyethylene (propylene) glycol ester, (meth)allylsulfonic acid (salts), and (meth) acrylic acid (salts), as described in Japanese Patent Application Laid-Open Publication No. 1-226757; copolymers containing (meth)acrylic acid polyethylene (propylene) glycol ester, (meth)allylsulfonic acid (or its salt) or p-(meth)allyloxybenzenesulfonic acid (or its salt), and (meth)acrylic acid (or its salt), as described in Japanese Patent Publication No. 5-36377; copolymers of polyethylene glycol mono(meth)allyl ester and maleic acid (or its salt), as described in Japanese Patent Application Laid-Open Publication No. 4-149056; copolymers containing (meth)acrylic acid polyethylene glycol ester, (meth)allylsulfonic acid (or its salt), (meth)acrylic acid (or its salt), alkanediol mono(meth)acrylate, polyalkylene glycol mono(meth)acrylate, and α,β-unsaturated monomers having amido groups in their molecules, as described in Japanese Patent Application Laid-open Publication No. 5-170501; copolymers containing polyethylene glycol mono (meth)allyl ether, polyethylene glycol mono(meth)acrylate, (meth)acrylic acid alkyl ester, (meth)acrylic acid (or its salt), and either (meth)allylsulfonic acid (or its salt) or p-(meth) allyloxybenzenesulfonic acid (or its salt), as described in Japanese Patent Application Laid-Open Publication No. 6-191918; copolymers or their hydrolyzed products, or their salts, containing alkoxypolyalkylene glycol monoallyl ether and maleic anhydride, as described in Japanese Patent Application Laid-Open Publication No. 5-43288; copolymers or their salts, or their esters, containing polyethylene glycol monoallyl ether, maleic acid, and monomers copolymerizable with the former monomers, as described in Japanese Patent Publication No. 58-38380; copolymers containing polyalkylene glycol (meth)acrylic acid ester type monomers, (meth)acrylic acid type monomers, and monomers copolymerizable with the former monomers, as described in Japanese Patent Publication No. 59-18338; copolymers or their salts, containing sulfonic acid group-containing (meth) acrylic acid esters and, if necessary, monomers copolymerizable with these esters, as described in Japanese Patent Application Laid-Open Publication No. 62-119147; esterification products obtained from copolymers of alkoxypolyalkylene glycol monoallyl ether and maleic anhydride, and polyoxyalkylene derivatives having alkenyl groups on their ends, as described in Japanese Patent Application Laid-open Publication No. 6-271347; esterification products obtained from copolymers of alkoxypolyalkylene glycol monoallyl ether and maleic anhydride, and polyoxyalkylene derivatives having hydroxyl groups on their ends, as described in Japanese Patent Application Laid-Open Publication No. 6-298555; and copolymers or their salts, as polycarboxylic acids (or their salts), containing alkenyl ether type monomers obtained by addition of ethylene oxide or the like to specific unsaturated alcohols such as 3-methyl-3-buten-1-ol, unsaturated carboxylic acid monomers, and monomers copolymerizable with the former monomers, as described in Japanese Patent Application Laid-open Publication No. 62-68806. These previously known cement dispersants may be used alone, or two or more kinds of them may also be used in combination.

The dispersant of the present invention can be used in combination with oxycarboxylic acid type compounds other than the above-described previously known cement dispersants. The addition of the oxycarboxylic acid type compounds makes it possible to exhibit further higher dispersibility retaining performance, even in high temperature environments. As the oxycarboxylic acid type compound, preferred are oxycarboxylic acids having 4 to 10 carbon atoms and their salts, and specific examples are gluconic acid, glucoheptonic acid, arabonic acid, malic acid, citric acid, their inorganic salts and organic salts, such as sodium, potassium, calcium, magnesium, ammonium, and triethanolamine salts. These oxycarboxylic acid type compounds may be used alone, or two or more kinds of them may also be used in combination. In these oxycarboxylic acid type compounds, gluconic acid and its salts are particularly suitable. In particular, in the case of poor addition concrete, it is preferable to use a lignin sulfonate type dispersant as a sulfonic acid type dispersant having a sulfonic acid group in its molecule and gluconic acid or its salt as an oxycarboxylic acid type compound.

In the case where the dispersant of the present invention and a previously known cement dispersant in combination, the mixing ratio of the dispersant of the present invention and the previously known cement dispersant (i.e., (dispersant of the present invention)/(previously known cement dispersant) in terms of solid content: ratio by mass) may preferably be (1 to 99)/(99 to 1), more preferably (5 to 95)/(95 to 5), still more preferably (10 to 90)/(90 to 10), and particularly preferably (20 to 80)/(80 to 20). Also, in the case where the dispersant of the present invention and an oxycarboxylic acid type compound in combination, the mixing ratio of the dispersant of the present invention and the oxycarboxylic acid type compound (i.e., (dispersant of the present invention)/(oxycarboxylic acid type compound) in terms of solid content: ratio by mass) may preferably be (1 to 99)/(99 to 1), more preferably (5 to 95)/(95 to 5), still more preferably (10 to 90)/(90 to 10), and particularly preferably (20 to 80)/(80 to 20). Further, in the case where three components, i.e., the dispersant of the present invention, the previously known cement dispersant, and the oxycarboxylic acid type compound, are used in combination, the mixing ratio of the dispersant of the present invention, the previously known cement dispersant, and the oxycarboxylic acid type compound (i.e., (dispersant of the present invention)/(previously known cement dispersant)/(oxycarboxylic acid type compound) in terms of solid content: ratio by mass) may preferably be (1 to 98)/(1 to 98)/(1 to 98), more preferably (5 to 90)/(5 to 90)/(5 to 90), still more preferably (10 to 90)/(5 to 85)/(5 to 85), and particularly preferably (20 to 80)/(10 to 70)/(10 to 70).

The above-described cement composition may contain previously known other cement additives (and materials) as recited in the following (1) to (11).

(1) Water-soluble polymer substances: unsaturated carboxylic acid polymers such as poly(acrylic acid) (sodium salt), poly(methacrylic acid) (sodium salt), poly(maleic acid) (sodium salt), and acrylic acid-maleic acid copolymer sodium salt; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharide derivatives of alkylated or hydroxyalkylated polysaccharides such as methyl cellulose, ethyl cellulose, hydroxyethyl cellulose, and hydroxypropyl cellulose, in which hydrogen atoms of part or all of the hydroxy groups are substituted with hydrophobic substituent groups having hydrocarbon chains having 8 to 40 carbon atoms as partial structures and ionic hydrophilic substituent groups having sulfonic acid groups or their salts as partial structures; polysaccharides produced by fermentation of yeast glucane, xanthane gum, β-1.3 glucanes (either straight chain type or branched chain type, and examples thereof are curdlane, paramylon, pachyman, scleroglucane, and laminaran) by microorganisms; polyacrylamide; poly(vinyl alcohol); starch; starch phosphoric acid ester; sodium alginate; gelatin; copolymers of acrylic acid having amino groups in their molecule and their quaternary compounds; and the like.

(2) Polymer emulsions: copolymers of various kinds of vinyl monomers such as alkyl (meth)acrylate, and the like.

(3) Curing retarders other than oxycarboxylic acid type compounds: saccharides, e.g., monosaccharides such as glucose, fructose, galactose, sucrose, xylose, apiose, ribose, and isomerized saccharides, oligosaccharides such as disaccharides and trisaccharides, oligosaccharides such as dextrin and polysaccharides such as dextrane, and molasses containing these saccharides; sugar alcohol such as sorbitol; magnesium silicide fluoride; phosphoric acid and its salts, and boric acid esters; aminocarboxylic acids and their salts; alkali-soluble proteins; humic acids; tannic acids; phenols; polyalcohols such as glycerin; phosphonic acid and its derivatives such as aminotri(methylenephosphonic acid), 1-hydroxyethylene-1,1-diphosphonic acid, ethylenediaminetetra(methylenephosphonic acid), diethylenetriamine penta(methylenephosphonic acid) and their alkali metal and alkaline earth metal salts; and the like.

(4) Quick strengthening and accelerating agents: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonates; thiosulfates; formic acid and formates such as calcium formate; alkanolamines; alumina cement; and calcium aluminate silicate; and the like.

(5) Defoaming agents other than oxyalkylene type defoaming agents: mineral oil type defoaming agents such as lamp oil and liquid paraffin; fat and oil type defoaming agents such as animal and plant oils, sesame oil, castor oil, and their alkylene oxide adducts; fatty acid type defoaming agents such as oleic acid, stearic acid, and their alkylene oxide adducts; fatty acid ester type defoaming agents such as glycerin monoricinolate, alkenylsuccinic acid derivatives, sorbitol monolaurate, sorbitol trioleate, and natural waxes; alcohol type defoaming agents such as octyl alcohol, hexadecyl alcohol, acetylene alcohol, and glycols; amide type defoaming agents such as acrylate polyamines; phosphoric acid ester type defoaming agents such as tributyl phosphate and sodium octylphosphate; metal soap type defoaming agents such as aluminum stearate and calcium oleate; and silicone type defoaming agents such as dimethylsilicone oil, silicone paste, silicone emulsion, organic-modified polysiloxanes (polyorganosiloxane such as dimethylpolysiloxane), and fluorosilicone oil; and the like.

(6) AE agents: resin soap, saturated or unsaturated fatty acids, sodium hydroxystearate, lauryl sulfate, ABS (alkylbenzenesulfonic acid), LAS (linear chain alkylbenzenesulfonic acid), alkane sulfonate, polyoxyethylene alkyl(phenyl) ether, polyoxyethylene alkyl(phenyl)ether sulfuric acid ester and its salts, polyoxyethylene alkyl(phenyl)ether phosphoric acid ester and its salts, protein materials, alkenylsulfosuccinic acid, and α-olefinsulfonate; and the like.

(7) Other surfactants: polyalkylene oxide derivatives obtained by adding 10 moles or more of alkylene oxides such as ethylene oxide and propylene oxide to aliphatic monohydric alcohols having 6 to 30 carbon atoms in their molecules, such as octadecyl alcohol and stearyl alcohol, alicyclic monohydric alcohols having 6 to 30 carbon atoms in their molecules, such as abietyl alcohol, monomercaptans having 6 to 30 carbon atoms in their molecules, such as dodecyl mercaptan, alkyl phenols having 6 to 30 carbon atoms in their molecules, such as nonyl phenol, amines having 6 to 30 carbon atoms in their molecules, such as dodecylamine, and carboxylic acids having 6 to 30 carbon atoms in their molecules, such as lauric acid and stearic acid; alkyl diphenyl ether sulfonic acid salts comprising two ether-bonded phenyl groups having sulfonic groups and optionally having alkyl groups or alkoxy groups as substituent groups; various kinds of anionic surfactants; various kinds of cationic surfactants such as alkylamine acetate and alkyltrimethylammonium chloride; various kinds of nonionic surfactants; and various kinds of amphoteric surfactants; and the like.

(8) Water-proofing agents: fatty acids (and their salts), fatty acid esters, fats and oils, silicones, paraffins, asphalt, waxes, and the like.

(9) Anti-rust agents; nitrites, phosphates, zinc oxide, and the like.

(10) Cracking reducing agents: polyoxyalkyl ethers and the like.

(11) Expanding materials; ettringite type expanding materials, coal type expanding materials, and the like.

Examples of the previously known cement additives (and materials) are cement wetting agents, thickeners, separation reducing agents, flocculants, drying and shrinkage reducing agents, strength enhancing agents, self-leveling agents, anti-rust agents, coloring agents, and anti-mold agents. These previously known cement additives (and materials) may be used alone, or two or more kinds of them may also be used in combination.

Particularly preferred embodiments of the components other than cement and water in the above-described cement composition are the following (1) to (4).

(1) Combinations of two components, i.e., the dispersant of the present invention and an oxyalkylene type defoaming agent, as essential components. Examples of the oxyalkylene type defoaming agent are polyoxyalkylenes, polyoxyalkylene alkyl ethers, polyoxyalkylene acetylene ethers, and polyoxyalkylene alkylamines. These oxyalkylene type defoaming agents may be used alone, or two or more kinds of them may also be used in combination. In these oxyalkylene type defoaming agents, polyoxyalkylene alkylamines are particularly preferred. The amount of the oxyalkylene type defoaming agents to be added may preferably be not smaller than 0.01% by mass and not greater than 20% by mass, relative to the weight of the lignin derivative contained in the dispersant of the present invention.

(2) Combinations of two components, i.e., the dispersant of the present invention and a segregation reducing agent, as essential components. Examples of the segregation reducing agent are various kinds of thickeners of nonionic cellulose ethers and compounds having, as their partial structures, hydrophobic substituent groups of hydrocarbon chains having 4 to 30 carbon atoms and polyoxyalkylene chains formed by adding 2 to 300 average mole number of alkylene oxides having 2 to 18 carbon atoms. These segregation reducing agents may be used alone, or two or more of them may also be used in combination. The mixing mass ratio of the dispersant of the present invention and the segregation reducing agents may preferably be (10/90) to (99.99/0.01) and more preferably (50/50) to (99.9/0.1). The cement composition containing this combination is useful for high fluidity concrete, self-compacting concrete, and self-leveling concrete.

(3) Combinations of two components, i.e., the dispersant of the present invention and an accelerating agent, as essential components. Examples of the accelerating agent are soluble calcium salts such as calcium chloride, calcium nitrite, and calcium nitrate; chlorides such as iron chloride and magnesium chloride; thiosulfates; and formic acid and formates such as calcium formate. These accelerating agents may be used alone, or two or more kinds of them may also be used in combination. The mixing mass ratio of the dispersant of the present invention and the accelerating agent may preferably be (10/90) to (99.9/0.1) and more preferably (20/80) to (99/1).

(4) Combinations of three components, i.e., the dispersant of the present invention, an oxyalkylene type defoaming agent, and an AE agent. Examples of the oxyalkylene type defoaming agent are polyoxyalkylenes, polyoxyalkylene alkyl ethers, polyoxyalkylene acetylene ethers, and polyoxyalkylene alkylamines. These oxyalkylene type defoaming agents may be used alone, or two or more kinds of them may also be used in combination. In these oxyalkylene type defoaming agents, polyoxyalkylene alkylamines are particularly preferred. The amount of the oxyalkylene type defoaming agents to be added may preferably be not smaller than 0.01% by mass and not greater than 20% by mass, relative to the weight of the lignin derivative contained in the dispersant of the present invention. On the other hand, the amount of the AE agent to be added may preferably be not smaller than 0.001% by mass and not greater than 2% by mass, relative to the weight of cement.

<<Novel Lignin Derivative>>

In the lignin derivatives to be added to the dispersant of the present invention, lignin Derivatives obtained by reaction of the kraft lignin and/or its salt with, as a water-soluble monomer, half esters or diesters of alkoxy(poly)alkylene glycols, which are obtained by adding 1 to 500 moles of alkylene oxides having 2 to 18 carbon atoms to alcohols having 1 to 30 carbon atoms or to amines having 1 to 30 carbon atoms, and unsaturated dicarboxylic acids, such as maleic acid, fumaric acid, itaconic acid, and citraconic acid; half esters or diesters of unsaturated dicarboxylic acids, such as maleic acid, fumaric acid, itaconic acid, and citraconic acid, and glycols having 2 to 18 carbon atoms or (poly)alkylene glycols having addition mole number of 2 to 500 moles of these glycols; esters of alkoxy(poly)alkylene glycols, which are obtained by adding 1 to 500 moles of alkylene oxides having 2 to 18 carbon atoms to alcohols having 1 to 30 carbon atoms, and unsaturated monocarboxylic acids, such as (meth)acrylic acid and crotonic acid; or addition compounds such as (poly)ethylene glycol monomethacrylate, (poly)propylene glycol monomethacrylate, and (poly)butylene glycol monomethacrylate, which are obtained by adding 1 to 500 moles of alkylene oxides having 2 to 18 carbon atoms to unsaturated monocarboxylic acids such as (meth)acrylic acid, comprises at least one component unit derived from the kraft lignin and/or its salt, at least one polyalkylene oxide chain, and at least one anionic functional group, and therefore, it is a novel lignin derivative.

That is, the novel lignin derivative of the present invention is characterized in that the lignin derivative comprises at least one component unit derived from kraft lignin and/or its salt, at least one polyalkylene oxide chain, and at least one anionic functional group. As a matter of course, the novel lignin derivative of the present invention is not limited to those obtained by the above-described production method.

The novel lignin derivative of the present invention has a mass average molecular weight, although it is not particularly limited, as the value measured by gel permeation chromatography (referred to hereinafter as "GPC" in some cases) in terms of polyethylene glycol, of preferably not lower than 1,000 and not higher than 500,000, more preferably not lower than 5,000 and not higher than 300,000, and still more preferably not lower than 10,000 and not higher than 150,000.

The novel lignin derivative of the present invention also has high dispersing performance, and therefore, it is particularly preferred as a dispersant. Also, since it comprises polyoxyalkylene oxide chains and anionic functional groups, it can be used for various applications, specific examples of which are chelating agents, detergents, flocculants, thickeners, coating agents, painting materials, adhesives, and water-absorbing resins.

EXAMPLES

The present invention will be described below more specifically by reference to examples and comparative examples; however, it should be noted that the present invention is, of course, not restricted by the following examples, but can be put into practice after appropriate changes and/or modifications in a range adapted to the purport described above and below, all of which changes and modifications are included in the technical scope of the present invention.

The molecular weight of the lignin derivative was measured under the following measurement condition (a) in Example 1 and Comparative Example 1 and under the following measurement condition (b) in Example 2.

<Measurement Condition (a)>

Column used: TSK guard column SWXL+TSK gel G4000SWXL+G3000SWXL+G2000SWXL, available from Tosoh Corporation;

Eluant: a solution was used, which had been obtained by dissolving 115.6 g of sodium acetate trihydrate in a mixed solvent containing 10,999 g of water and 6,001 g of acetonitrile and then adjusting the pH to 6.0 with acetic acid;

Sample loading amount: 100 µL;

Flow speed: 0.8 mL/min;

Column temperature: 40° C.;

Detector: 2414 differential refraction detector, available from Nippon Waters Inc.;

Analysis software: Empower Software, available from Nippon Waters Inc.;

Standard substances for calibration curve preparation: polyethylene glycols [peak top molecular weight (Mp): 272, 500, 219,300, 107,000, 50,000, 26,840, 11,840, 7,100, 4,250, and 1,470];

Calibration curve: produced by a three-degree equation from the Mp values of the above-described polyethylene glycols and their elution times;

The respective polymers (in the form of aqueous solutions) dissolved in a concentration of 0.5% by mass for each polymer in the above-described eluant, and the resulting solutions were used as samples.

<Measurement Condition (b)>

Column used: TSK guard column α and TSK gel α-5000, α-4000, and α-3000, available from Tosoh Corporation, were connected in this order;

Eluant: a solution was used, which had been obtained by dissolving 27.9 g of boric acid and 33.8 g of potassium chloride in a solution containing 1,000.0 g of acetonitrile and 8,938.4 g of water and then adjusting the pH to 9.0 with a 30% NaOH aqueous solution;

Sample loading amount: 100 µL;

Flow speed: 0.6 mL/min;

Column temperature: 40° C.;

Detector: 2414 differential refraction detector, available from Nippon Waters Inc.;

Analysis software: Empower Software, available from Nippon Waters Inc.;

Standard substances for calibration curve preparation: polyethylene glycols [peak top molecular weight (Mp): 685, 000, 272,500, 219,300, 107,000, 50,000, 26,840, 11,840, 7,100, 4,250, and 1,470];

Calibration curve: produced by a three-degree equation from the Mp values of the above-described polyethylene glycols and their elution times;

The respective polymers (in the form of aqueous solutions) were dissolved in a concentration of 0.5% by mass for each polymer in the above-described eluant, and the resulting solutions were used as samples.

Example 1

Figure 1:
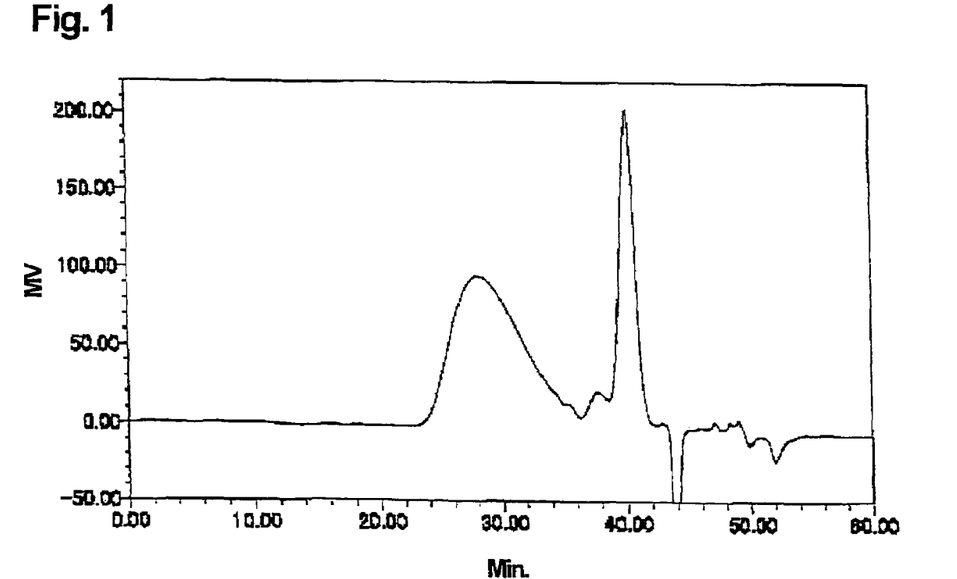
FIG. 1 is a GPC chart, measured by RI, of the lignin derivative obtained in Example 1.
Figure 2:
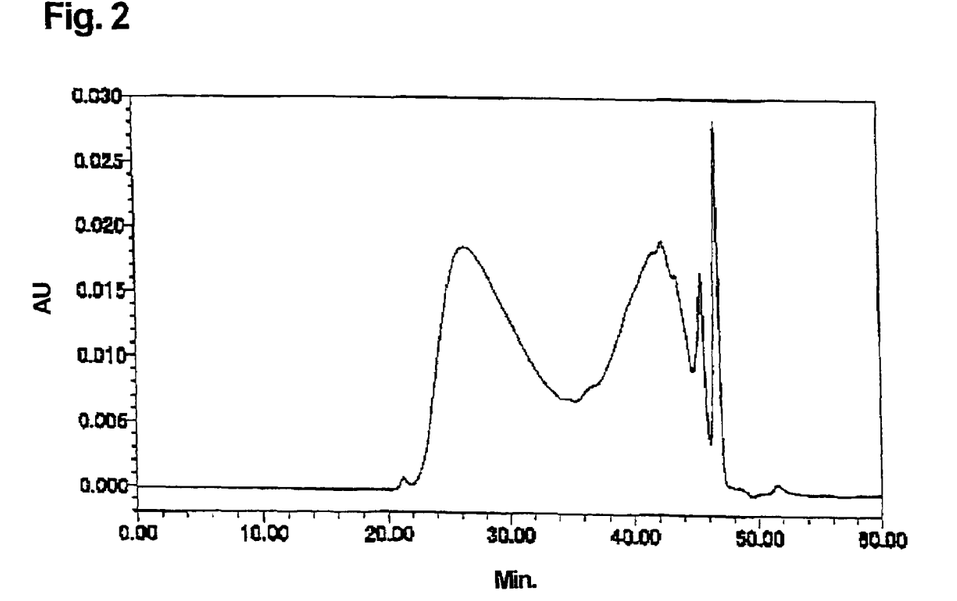
FIG. 2 is a GPC chart, measured by UV, of the lignin derivative obtained in Example 1.

To a reaction apparatus made of glass and equipped with a thermometer, a stirrer, a dropping device, a nitrogen gas introduction tube, and a reflux flow cooling device, there were loaded 98.7 g of water, 152.4 g of polyethylene glycol mono (3-methyl-3-butenyl)ether (average addition mole number of ethylene oxide: 50) 0.3 g of acrylic acid, and 2.1 g of kraft lignin (trade name No.: 37095-9, available from Aldrich), and the atmosphere in the reaction apparatus was replaced with nitrogen gas under stirring, followed by heating to 58° C. under the nitrogen gas atmosphere. After the solution temperature reached 58° C., an aqueous solution obtained by diluting 0.5 g of a 30% hydrogen peroxide aqueous solution with 6.3 g of water was added, and immediately, an aqueous monomer solution obtained by diluting 9.2 g of acrylic acid with 21.5 g of water and 32.6 g of an aqueous chain transfer agent solution obtained by mixing 0.2 g of L-ascorbic acid and 0.4 g of 3-mercaptopropionic acid as a chain transfer agent started to be added dropwise. The aqueous monomer solution was added for 3 hours, and the aqueous chain transfer agent solution was added for 3.5 hours. After completion of the dropwise addition of the aqueous chain transfer agent solution, the reaction solution was kept at 58° C. continuously for 2 hours to complete the polymerization reaction, thereby obtaining a polycarboxylic acid type polymer (1) having an mass average molecular weight of 33,000 as a novel lignin derivative of the present invention. With respect to the thus obtained polycarboxylic acid type polymer (1), a GPC chart (measured with the differentiation refraction detector) is shown in FIG. 1, and a GPC chart (measured at a wavelength of 230 nm with the ultraviolet absorbance detector) is shown in FIG. 2. In FIGS. 1 and 2, the axis of ordinates represents a detection intensity, and the axes of abscissa represents a retention time.

Comparative Example 1

Figure 3:
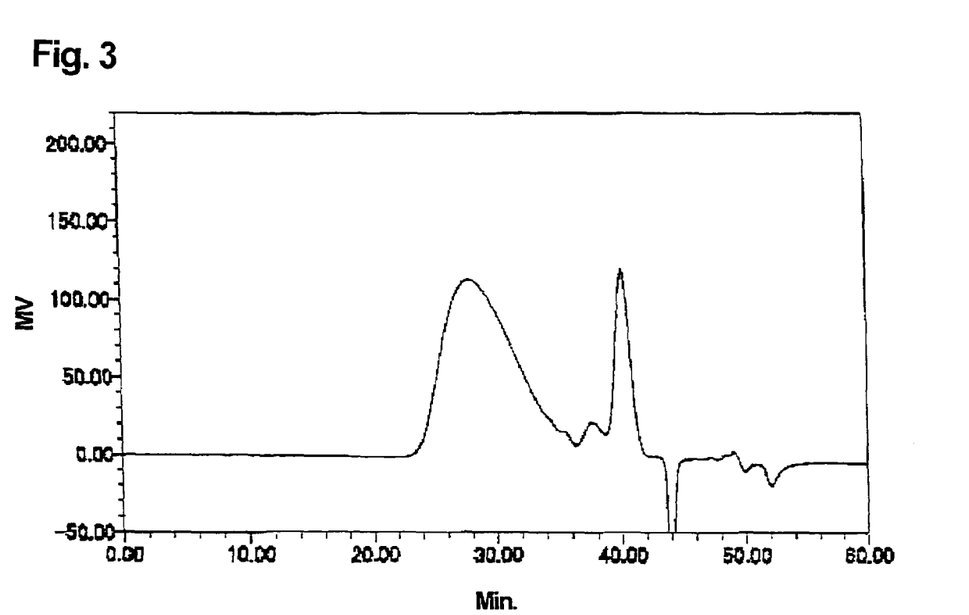
FIG. 3 is a GPC chart, measured by RI, of the comparative polymer obtained in Comparative Example 1.
Figure 4:
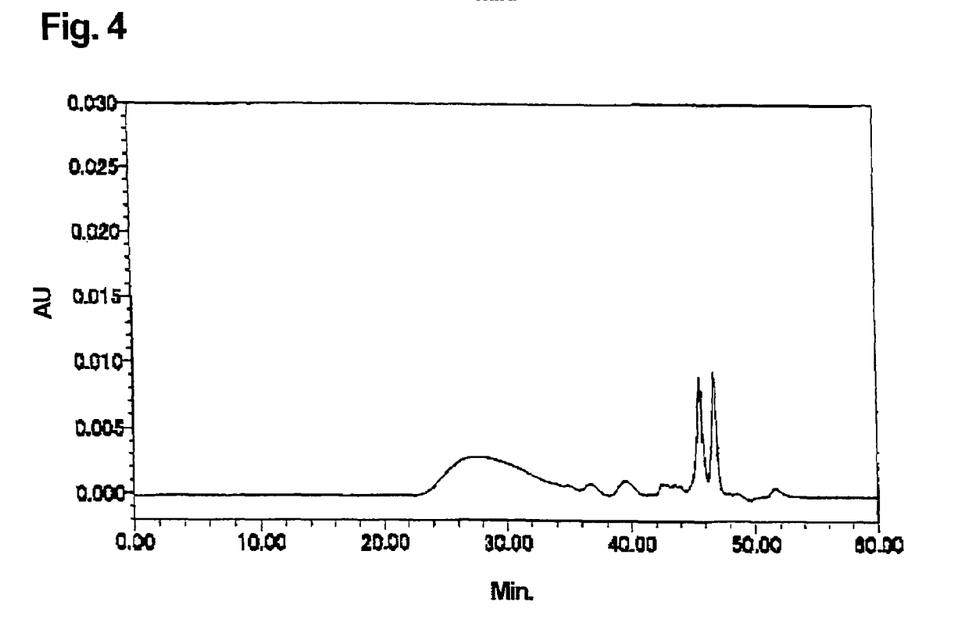
FIG. 4 is a GPC chart, measured by UV, of the comparative polymer obtained in Comparative Example 1.

A polycarboxylic acid type comparative polymer (1) having no lignin skeleton and an mass average molecular weight of 33,000 was obtained in the same manner as described in Example 1, except that no kraft lignin was used. With respect to the thus obtained polycarboxylic acid type comparative polymer (1), a GPC chart (measured with the differentiation refraction detector) is shown in FIG. 3, and a GPC chart (measured at a wavelength of 230 nm with the ultraviolet absorbance detector) is shown in FIG. 3. In FIGS. 3 and 4, the axis of ordinates represents a detection intensity, and the axes of abscissa represents a retention time.

According to the GPC charts measured by RI in FIGS. 1 and 3, it is found that approximately similar polymers were produced. Then, according to the GPC charts measured by UV in FIGS. 2 and 4, it is found that the UV absorption of a polymer at a retention time of about 26 minutes for the polycarboxylic acid type polymer (1) obtained by polymerization in the presence of kraft lignin was significantly high as compared with the UV absorption of a polymer at a retention time of about 26 minutes for the polycarboxylic acid type comparative polymer (1). This indicates that the polycarboxylic acid type polymer (1) has a kraft lignin skeleton incorporated in the polymer skeleton, which kraft lignin skeleton contains an aromatic ring giving high UV absorbance. Therefore, the novel lignin derivative of the present invention comprises a component unit derived from the kraft lignin and/or its salt, polyalkyleneoxide chains, and anionic functional groups.

Test Example 1

<Mortar Composition and Kneading Method>
Mortar kneading was carried out as follows.

To a Hobart mixer (Model No. N-50, available from Hobart Corporation), there were loaded 1,080 g of ordinal Portland cement available from Taiheiyo Cement Corporation and 1,350 g of standard sand for cement strength tests (prescribed in section 5.1.3 of JIS R 5201-1997, attached document 2), followed by kneading in dry state at a low rotation speed for 10 seconds, and 324 g of a dilution obtained by weighing a dispersant in a prescribed amount shown in Table 1 and a defoaming agent (trade name "MA 404", available from NMB Corporation; 21.6 g of a 1% aqueous solution thereof) and then diluting with water was added to the mixer for 10 to 20 seconds. Kneading was continued at a low speed for 5.5 minutes from the start of kneading in dry state, and rotation was stopped. After 6.5 minutes from the start of kneading in dry state, the kneaded mortar was packed in two layers in a flow cone (described in JIS R 5201-1997). The cone was pulled up after 10 minutes from the start of kneading in dry state to measure the flow of the spread mortar, and the measured value was defined as the flow after 0 minute. The flow measurement was carried out according to JIS R 5201-1997. The flow value shows that dispersibility is higher as the numeral value is higher. The results of the mortar tests are shown in Table 1.

TABLE 1

| Main component of dispersant | Amount for addition (% by mass, relative to cement mass) | Flow (mm) |
| --- | --- | --- |
| Polycarboxylic acid type polymer (1) of Example 1 (lignin derivative) | 0.13 | 157 |
| | 0.14 | 180 |
| | 0.15 | 201 |
| Polycarboxylic acid type comparative polymer (1) of Comparative Example 1 | 0.14 | 153 |
| | 0.15 | 165 |

As can be seen from Table 1, in comparison of the polycarboxylic acid type polymer (1), which is a lignin derivative, and the polycarboxylic acid type comparative polymer (1), which is not a lignin derivative, the mortar obtained by use of the polycarboxylic acid type polymer (1) having an introduced kraft lignin skeleton had higher flow value in the same amounts for addition. That is, it is found that the polycarboxylic acid type polymer (1), which is a lignin derivative, has more excellent cement dispersing performance.

Example 2

Figure 5:
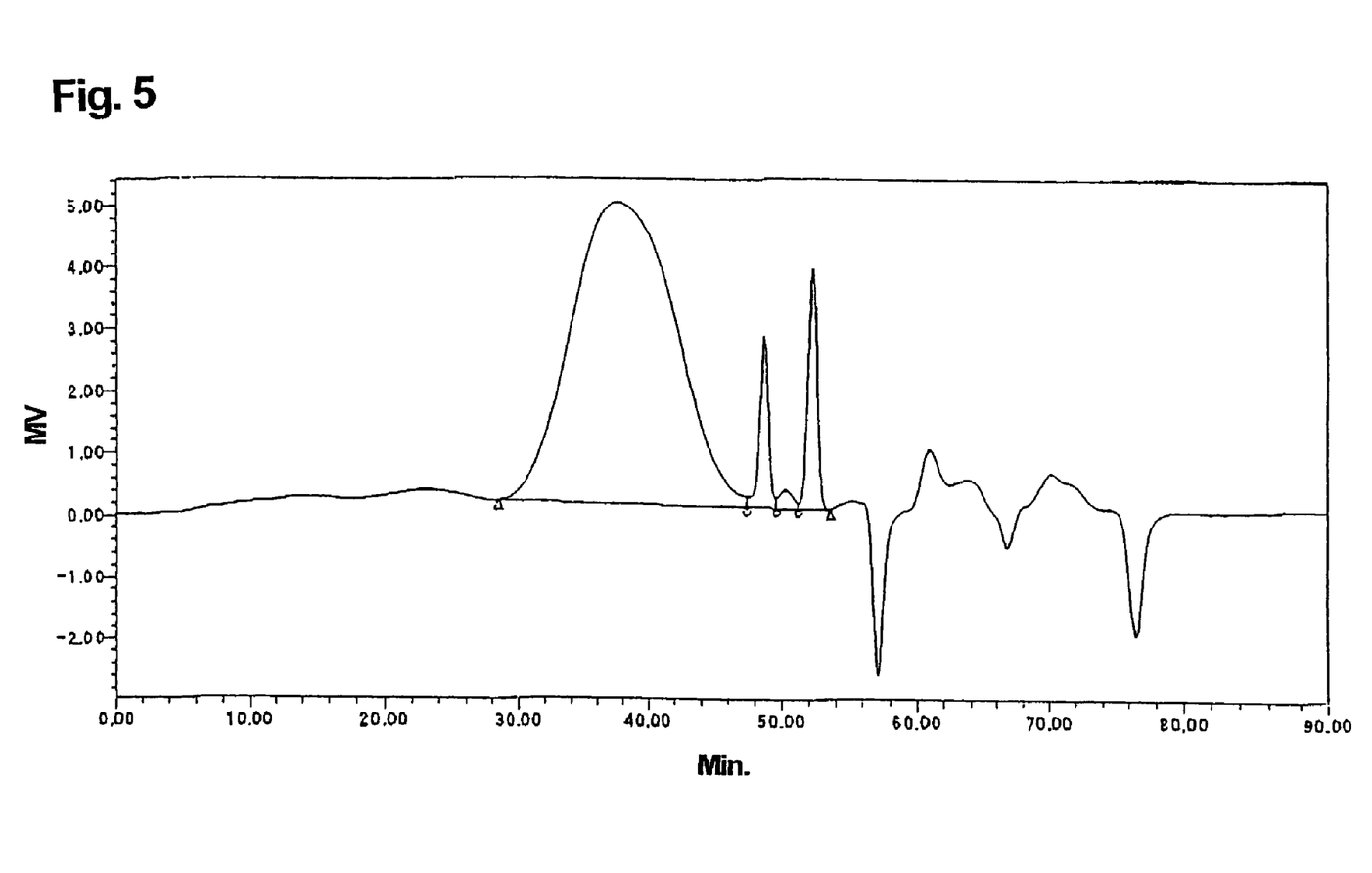
FIG. 5 is a GPC chart, measured by RI, of the lignin derivative obtained in Example 2.

To a reaction apparatus made of glass and equipped with a thermometer, a stirrer, a dropping device, a nitrogen gas introduction pipe, and a reflux flow cooling device, there were loaded 16.0 g of an aqueous kraft lignin solution (solid content: 21.5%) and 64.0 g of water, and the atmosphere of the reaction apparatus was replaced with nitrogen gas under stirring, followed by heating to 80° C. under the nitrogen gas atmosphere. After the solution temperature reached 80° C., 160.0 g of a 37% sodium acrylate solution and 80.0 g of a 10% sodium persulfate solution were added dropwise for 3 hours. After completion of the dropwise addition, the reaction solution was kept at 80° C. continuously for 1 hour to complete the graft polymerization reaction, thereby obtaining a graft polymer (1), which is a lignin derivative. A GPC chart of the graft polymer (1) (measured with the differentiation refraction detector) is shown in FIG. 5. The mass average molecular weight of the graft polymer (1) was found to be 59,200 by the measurement with the differentiation refraction detector. Also, a GPC chart of the graft polymer (1) measured at a wavelength of 230 nm with the ultraviolet absorbance detector is shown in FIG. 6.

Figure 7:
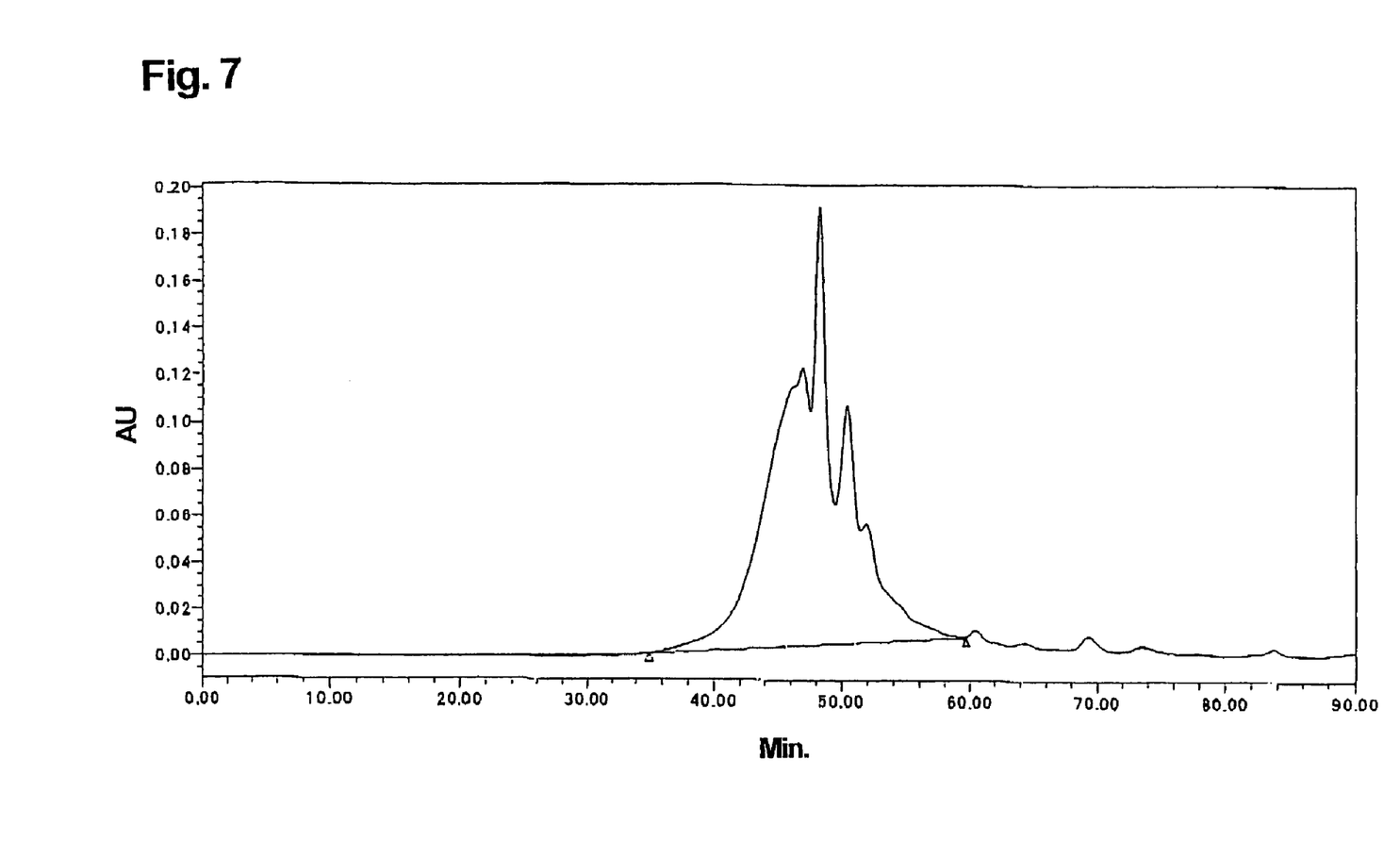
FIG. 7 is a GPC chart, measured by UV, of the kraft lignin used as a raw material in Example 2.
Figure 8:
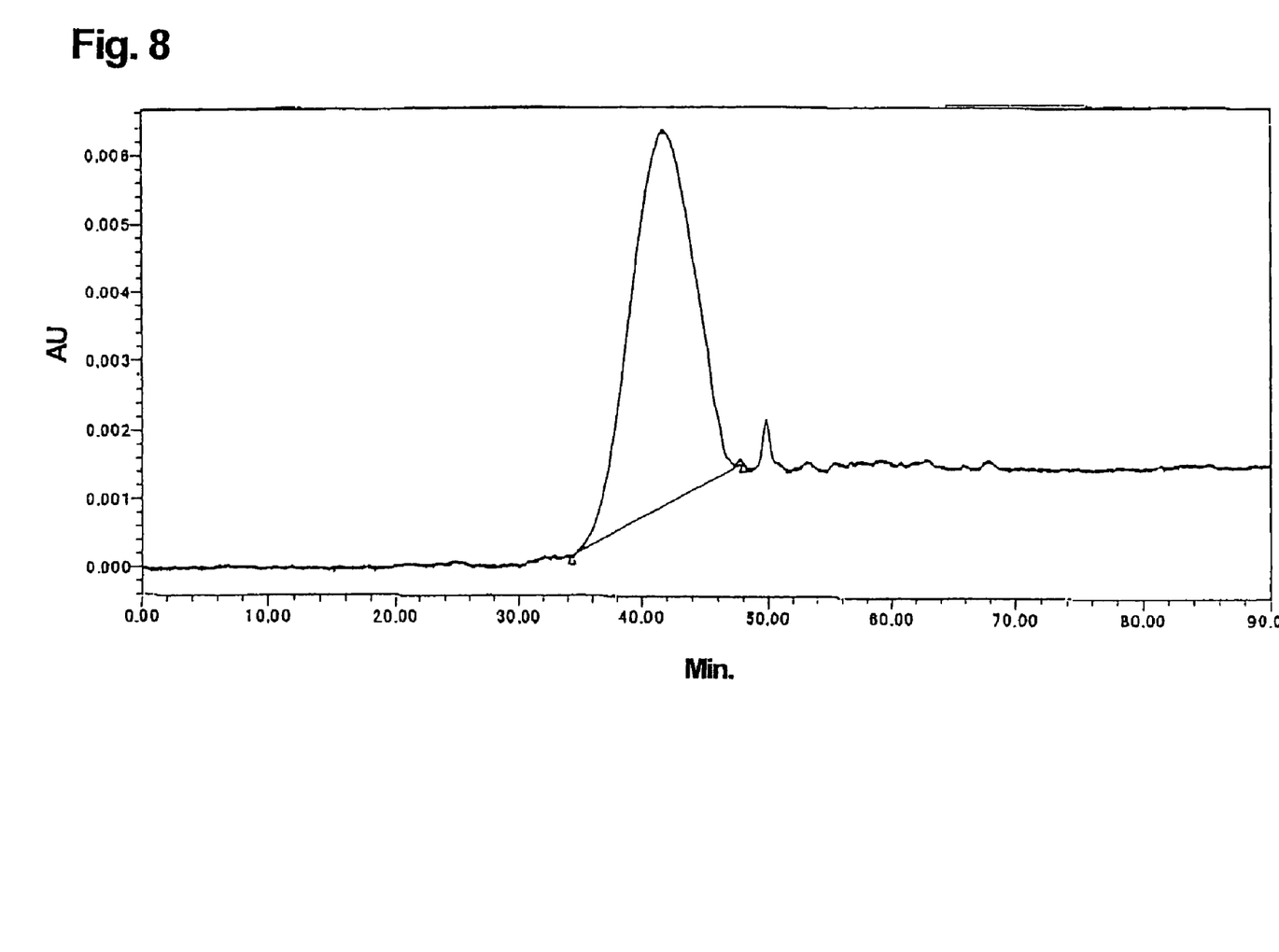
FIG. 8 is a GPC chart, measured by UV, of the commercially available poly(acrylic acid) sodium salt.

A GPC chart, measured with the differentiation refraction detector, of the kraft lignin used as the raw material in Example 2 is shown in FIG. 7. A GPC chart, measured with the differentiation refraction detector, of a commercially available poly(acrylic acid) sodium salt (mass average molecular weight: about 5,000) is shown in FIG. 8.

Figure 6:
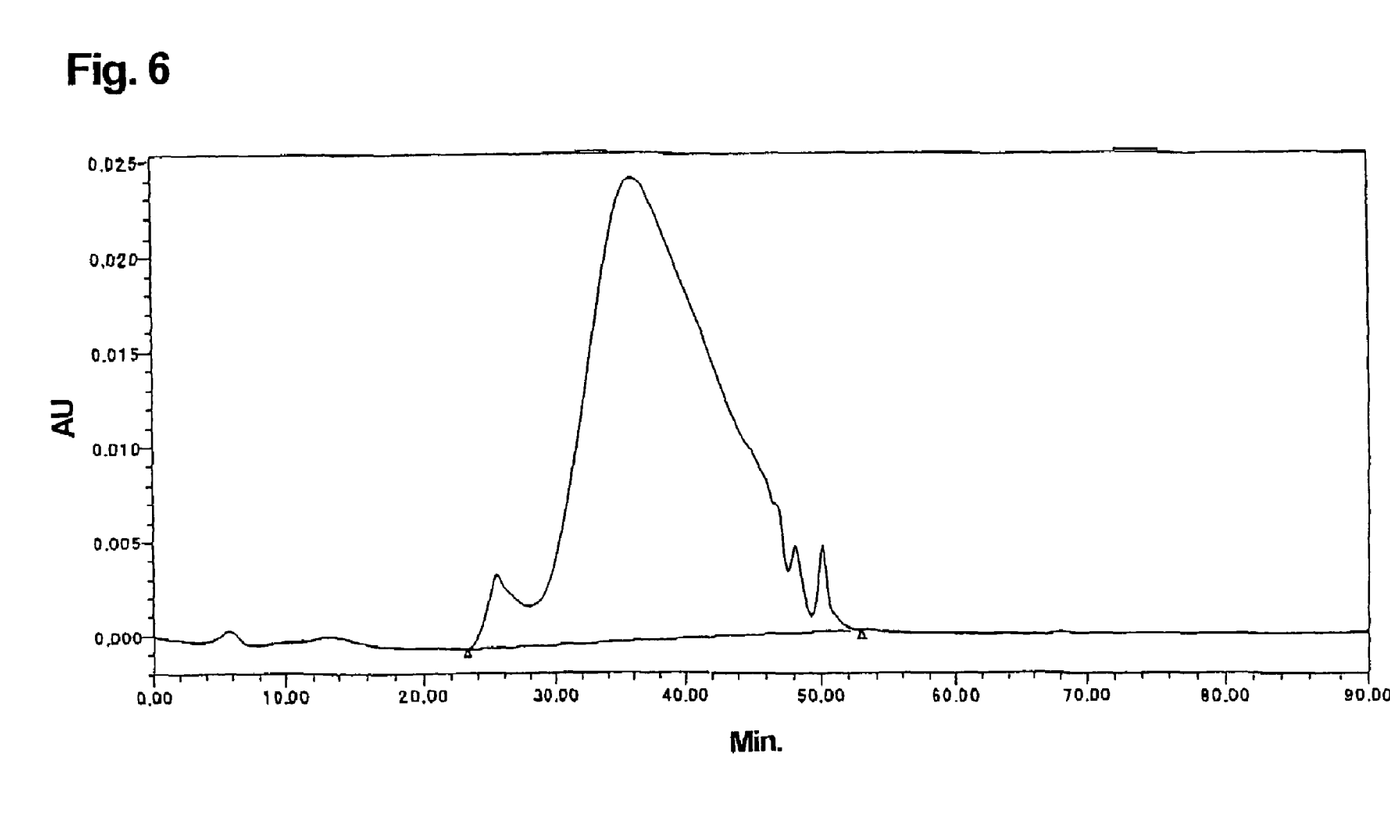
FIG. 6 is a GPC chart, measured by UV, of the lignin derivative obtained in Example 2.

As can be seen from FIG. 6, it was found that there was a peak of a polymer (peak top retention time: about 36 minute) which is not observed in FIG. 7, i.e., the GPC chart of the graft lignin as the raw material. The UV absorbance of the peak top of the polymer was about 0.024 AU.

From the GPC chart (FIG. 8) of the poly(acrylic acid) sodium salt measured with the same polymer concentration as that in the GPC measurement shown in FIG. 6, the UV absorbance of the peak top was found to be about 0.006 AU.

From these facts, it is found that the graft polymer (1) obtained in Example 2 is poly(acrylic acid) type polymer having a high molecular weight and a kraft lignin skeleton with a high UV absorbance.

Test Example 2

<Mortar Composition and Kneading Method>
Mortar kneading was carried out as follows.

To a Hobart mixer (Model No. N-50, available from Hobart Corporation), there were loaded 707.5 g of ordinal Portland cement available from Taiheiyo Cement Corporation and 540 g of Toyoura standard sand, followed by kneading in dry state at a low rotation speed for 10 seconds, and then the stirring was stopped. The kneading was started again at a low rotation speed, and at the same time, 375.5 g of a dilution obtained by weighing a dispersant in a prescribed amount shown in Table 2 and a defoaming agent (trade name: "MA 404", available from NMB Corporation; 28.3 g of a 1% aqueous solution thereof) and then diluting with water was added to the mixer for 15 seconds. Kneading was continued at the same kneading speed for 30 seconds, and then 1,350 g of standard sand for cement strength tests (prescribed in section 5.1.3 of JIS R 5201-1997, attached document 2) was added to the mixer for 5 seconds. Further, the kneading was continued at the same kneading speed for 60 seconds, followed by kneading at a rotation speed changed to a middle rotation speed for 30 second, and the rotation was stopped. After 15 seconds from the stop of the rotation, the mortar adhering to the wall face was scraped, and after 30 seconds from the stop of the rotation, the kneading was started again at a middle speed and carried out for 1 minute, and the rotation was stopped. The kneaded mortar was packed in three layers in a mini slump cone (described in JIS A 1173) to measure the slump value of the mortar. The slump value of mortar shows that dispersibility is higher as the numeral value is higher. The results of the mortar tests are shown in Table 2.

TABLE 2

| Main component of dispersant | Amount for addition (% by mass, relative to cement mass) | Slump (mm) | | Air amount (%) |
| --- | --- | --- | --- | --- |
| | | Just after completion of kneading | After 30 min. from completion of kneading | |
| Graft polymer (1) of Example 2 (lignin derivative) | 0.18 | 75 | 62 | 2.1 |
| Lignin sulfonic acid* | 0.18 | 82 | 47 | 1.1 |
| Kraft lignin | 0.18 | 71 | — | 2.9 |

*Pozzolith No. 70 (available from Pozzolith Bussan Co., Ltd.

As can be seen from Table 2, when the graft polymer (1), which is a lignin derivative, was used as a dispersant, high slump values were obtained from the time just after completion of the kneading of the mortar to the time after 30 minutes from completion of the kneading. In contrast, when the lignin sulfonic acid was used as a dispersant, a high slump value was shown just after completion of the kneading, but the slump value was decreased to a half after 30 minutes from completion of the kneading. Also, when the kraft lignin was used as a dispersant, a high slump value was shown just after completion of the kneading, but the mortar was too hard to measure the slump after 30 minutes from completion of the kneading. As described above, it is found that the lignin derivatives each comprising a component unit derived from kraft lignin and/or its salt and a component unit derived from the water-soluble monomer (in the cases of Example 2, acrylic acid) exhibit high dispersing performance.

INDUSTRIAL APPLICABILITY

The dispersant of the present invention can exhibit high dispersing performance as compared with conventional dispersants such as lignin sulfonic acid. Therefore, the dispersant of the present invention is useful for dispersing various kinds of materials to be dispersed. The novel lignin derivative of the present invention can also exhibit high dispersing performance, and therefore, it can widely be used, for example, for dispersants, chelating agents, detergents, flocculants, thickeners, coating agents, painting materials, adhesives, water-absorbing resins, and the like.

We claim:

1. A lignin derivative comprising a component unit derived from kraft lignin and/or its salt; a polyalkylene oxide chain; and an anionic functional group,
    wherein the kraft lignin and/or its salt has a functional group,
    wherein the polyalkylene oxide chain and anionic functional group are derived from a radical polymerizable water-soluble monomer,
    wherein the radical polymerizable water-soluble monomer comprises a carboxyl group as the anionic functional group, and
    wherein the lignin derivative is obtained by reacting the functional group of the kraft lignin and/or its salt with:
    an alkylene oxide addition compound of an unsaturated alcohol, which is obtained by adding 2 to 300 moles of alkylene oxides to the unsaturated alcohol, to introduce the polyalkylene oxide chain; and
    the radical polymerizable water-soluble monomer comprising the carboxyl group as the anionic functional group,
    followed by polymerization.

2. The lignin derivative according to claim 1, which is a cement dispersant.

* * * * *